United States Patent
Pechoux et al.

(10) Patent No.: US 6,418,793 B1
(45) Date of Patent: Jul. 16, 2002

(54) DIFFERENTIAL PRESSURE SENSOR

(75) Inventors: Christophe Pechoux, Torcy; Jean-Pierre Cheveux, Lagny, both of (FR)

(73) Assignee: A Theobald SA (FR)

( * ) Notice: Subject to any disclaimer, the term of this patent is extended or adjusted under 35 U.S.C. 154(b) by 0 days.

(21) Appl. No.: 09/601,819

(22) PCT Filed: Feb. 16, 1999

(86) PCT No.: PCT/FR99/00339

§ 371 (c)(1),
(2), (4) Date: Aug. 8, 2000

(87) PCT Pub. No.: WO99/42802

PCT Pub. Date: Aug. 26, 1999

(30) Foreign Application Priority Data

Feb. 18, 1998 (FR) .............................................. 98 01956

(51) Int. Cl.⁷ ................................................. G01L 7/00
(52) U.S. Cl. ........................................................ 73/714
(58) Field of Search ........................... 73/714, 718, 724, 73/706; 361/283

(56) References Cited

U.S. PATENT DOCUMENTS

| | | | |
|---|---|---|---|
| 4,433,580 A | * 2/1984 | Tward | 73/718 |
| 4,603,371 A | * 7/1986 | Frick | 361/283 |
| 5,056,369 A | * 10/1991 | Tamai et al. | 73/718 |
| 5,150,275 A | * 9/1992 | Lee et al. | 361/283 |

FOREIGN PATENT DOCUMENTS

| | | |
|---|---|---|
| FR | 2490815 A | 3/1982 |
| GB | 2059071 A | 4/1981 |
| GB | 2189607 | 10/1987 |
| JP | 01021330 A | 1/1989 |

* cited by examiner

*Primary Examiner*—Max Noori
*Assistant Examiner*—Jewel V. Thompson
(74) *Attorney, Agent, or Firm*—Webb Ziesenheim Logsdon Orkin & Hanson, P.C.

(57) ABSTRACT

A pressure sensor operates on the principle of a differential pair of capacitors having a movable plate that is constituted by the deformable membrane of the sensor. It comprises a measurement circuit for measuring the capacitance of the capacitor, which circuit is incorporated in the housing of the sensor and is made up of first and second double-sided interconnected circuits which are situated on either side of the membrane and which are connected thereto in its peripheral region by connection means. The faces of the circuits which face the membrane serve to mount respective stationary plates of the capacitor, and the faces of the circuits which face away from the membrane comprise respective regions on which components that are sensitive to the displacement of the membrane towards one or other of the fixed plates are mounted, and a region that is insensitive to stray capacitance is also provided on one of the faces that face away from the membrane, for receiving the components forming the remainder of the measurement circuit.

10 Claims, 4 Drawing Sheets

DIFFERENTIAL PRESSURE SENSOR

The present invention relates to a differential pressure sensor comprising a housing formed of two portions that are assembled together and that define a closed internal cavity between them, a deformable membrane dividing said internal cavity into two non-communicating chambers which are in communication with sources of fluid under pressure by means of two orifices respectively formed in said portions of the housing, said membrane being made in such a manner as to constitute a plate of first and second variable capacitance capacitors by being associated with two other plates installed in stationary manner in the housing of the sensor on either side of the movable central plate formed by the membrane, and sensor means that is sensitive to the deformation of the membrane as a result of a difference between the pressures existing in the two chambers in order to produce an electrical signal representative of said pressure difference.

BACKGROUND OF THE INVENTION

Presently, sensors of this type are used in particular to measure very small differences in pressure (less than 1 Pa). From the fact that the sensors operate on the principle of a differential pair of capacitors rather than on the principle of a single capacitor, they are less sensitive to the effects of temperature affecting pressure measurement. Such effects constitute the main difficulty to be resolved in the manufacture of differential pressure sensors. Those that are most often seen in practice are of two types. They are expressed firstly by deformation (e.g. expansion) of the membrane which, even when displacement is very small, causes a variation in "pressure zero", and secondly by a variation of the sensitivity of the measurement device (measured in V/Pa) if an element of the sensor is deformed (plates, membranes, housing portions, etc. . . . ). It has been observed, for example, that a displacement of the membrane by about 1 $\mu$m caused by a temperature variation is interpreted in the measurement as a pressure difference of 1 Pa. The advantage of the above-mentioned sensors is imparted by the symmetry of their structure which enables them to compensate for the effects of temperature, any increase and any decrease in the capacitance of the first variable capacitor respectively causing a corresponding reduction and a corresponding increase in the capacitance of the second variable capacitor.

However, capacitance sensors present a certain number of problems. One of the problems, which relates to the mechanical structure of the sensor, results from the very costly use of insulating material serving firstly to ensure sealing where each plate passes through the corresponding portions of the housing and to maintain the mechanical dimensions over the working temperature range, and secondly to ensure symmetrical setting of the plates, since the slightest variation in the distance between the plates and the membrane distorts measurement.

Another fundamental problem of that type of sensor results from the cabling which connects the sensor to the measurement device and which results in amounts of stray capacitance that are significant relative to the capacitances which vary over time as a function of pressure and of temperature. Many instances of stray capacitance can be observed, in particular due to the wires connecting each of the plates to ground which is referenced on the housing of the sensor, said ground having the drawback of being situated in the proximity of the wires which connect each plate to the measurement device. Stray capacitance is also created between the bushing of each plate and the portion of the sensor housing which is associated therewith. It is easily understood that the existence of all the stray capacitance can only be harmful to the accuracy of the measurement of the pressure difference, since capacitance can vary just as much when the wires move as under the effect of deformation or variation in the characteristics of the elements which make up the sensor.

Finally, yet another problem can be noted that frequently occurs with that type of sensor, the problem being that of guaranteeing that the membrane remains insulated over time so as to prevent dust, corrosion, moisture, etc. from creating potential defects which distort the measurements. In practice, insulating membranes and an intermediate dielectric fluid are often used, the deformable measurement membrane being immersed in the fluid between the insulating membranes. As a result, sensors are difficult to make and their cost is high.

OBJECTS AND SUMMARY OF THE INVENTION

An object of the present invention is thus to provide a pressure sensor which is simple to manufacture, low cost, capable of measuring very small differential pressures, e.g. of about 1 Pa or less, while being much less sensitive to variations in temperature and in the surroundings in which it operates.

Another object of the present invention is to provide a pressure sensor which is relatively insensitive to the stray capacitance of its components.

To this end, in the differential pressure sensor of the invention the sensor means comprise a measurement circuit for measuring the corresponding capacitances of the first and second variable capacitance capacitors. The circuit is made up of first and second double-sided interconnected circuits, of size similar to that of the membrane, which are respectively disposed in the two non-communicating chambers close to the membrane and parallel to said membrane in such a manner as to divide each of the chambers into two communicating portions. The interconnected circuits are fixed to the membrane in its peripheral region by connection means. The faces of the circuits which face the deformable membrane each comprise a region on which the fixed plate of the corresponding first or, second variable capacitance capacitor is installed. The faces of the circuits which face away from the membrane each comprise a respective region on which the components that are sensitive to the displacement of the membrane towards one or other of the fixed plates are respectively mounted, and a respective region that is insensitive to stray capacitance, which regions are respectively constituted by the peripheral regions of the circuits, another region that is insensitive to stray capacitance being provided on one of said faces facing away from the membrane for mounting the components which form the remainder of the measurement circuit.

BRIEF DESCRIPTION OF THE DRAWINGS

Other characteristics and advantages of the present invention appear better from the following description of a preferred embodiment of the invention, given with reference to the accompanying drawings, in which.

MORE DETAILED DESCRIPTION

Figure 1:
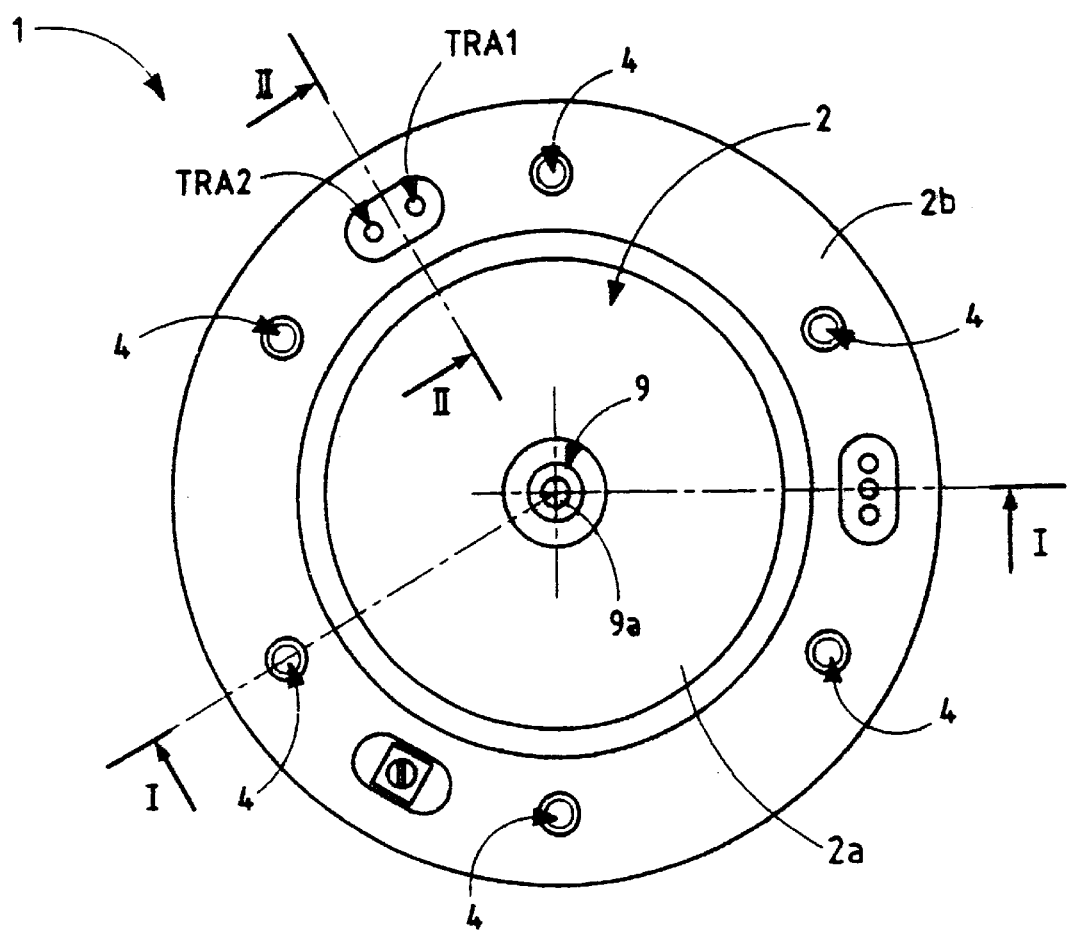
FIG. 1 is a view from above of the housing of the pressure sensor of the invention.
Figure 2:
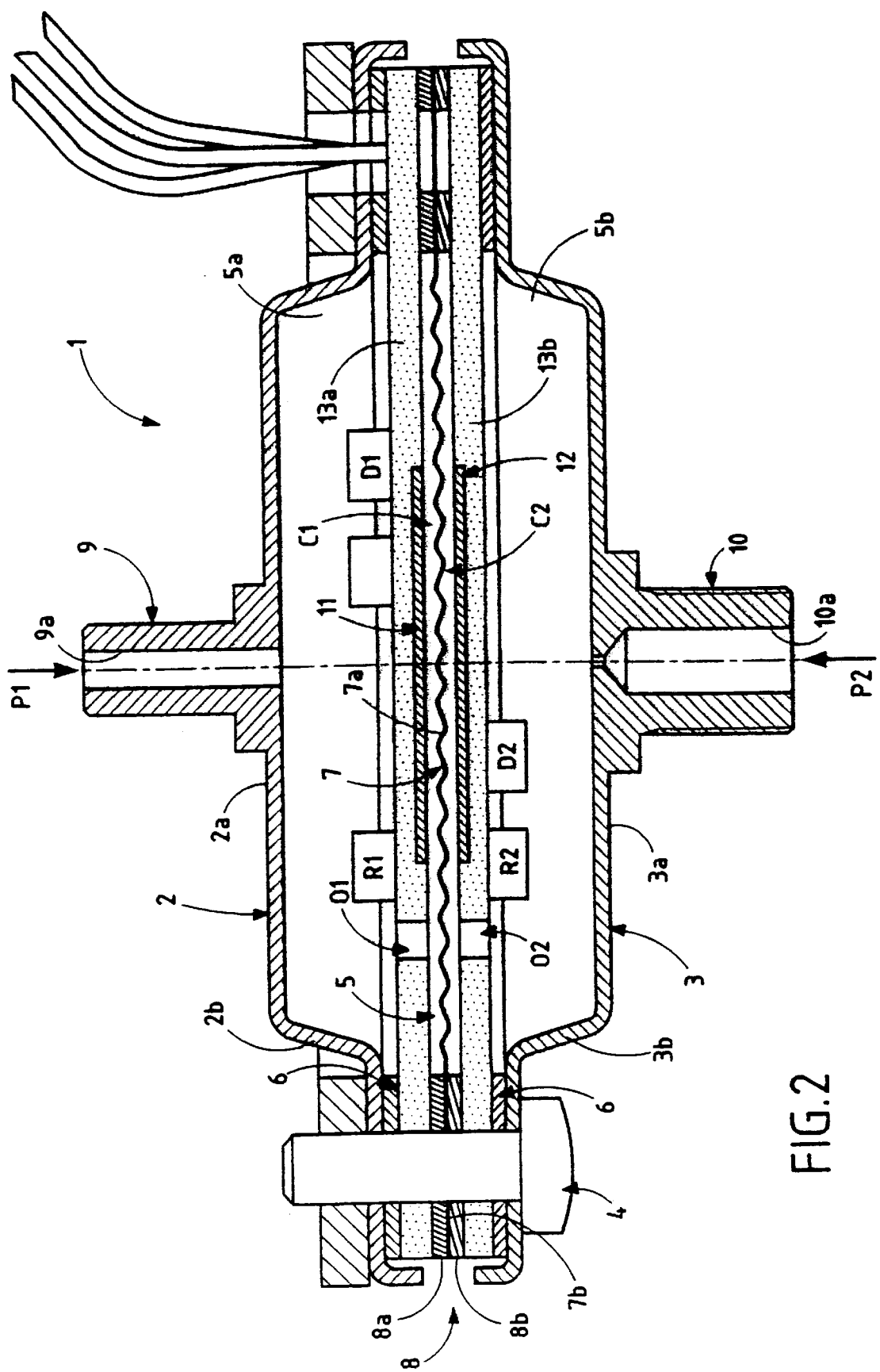
FIG. 2 is a section view of the sensor on line I—I of FIG. 1.

The pressure sensor shown in FIGS. 1 and 2 comprises a housing 1 made up of two similar portions 2 and 3 that are assembled together by screws 4 and that define a closed internal cavity 5 between them, which cavity is preferably cylindrical in shape. As can be seen in FIG. 1, the housing is circular in shape, but it could naturally be of some other shape, e.g. rectangular. A sealing gasket 6, made of elastomer material or of a gasket material that is compatible with the fluid(s) whose pressure is to be measured, is interposed between the two portions 2 and 3 of the housing 1. With reference to FIG. 2, the portions 2 and 3 of the housing are dish shaped in section view, respectively having flat main walls 2a and 3a of predetermined thickness, and peripheral walls 2b and 3b of predetermined height which extend substantially perpendicularly to the main walls 2a and 3a which are associated therewith, and which then extend parallel to said main walls, and terminate with the free ends of the walls 2b and 3b respectively being curved downwards and upwards.

The internal cavity 5 of the housing 1 is divided into two non-communicating chambers 5a and 5b by a deformable membrane or diaphragm 7. The membrane 7 is generally circular in shape and includes an annular portion 7a having, in section view, an undulating profile and a flat peripheral annular portion 7b which is trapped between the portions 2 and 3 of the housing 1 by connection means 8 which are described in greater detail below.

The portion 2 of the housing includes a coupling 9 pierced with an orifice 9a enabling the chamber 5a to be put into communication with a first source of fluid (not shown) at a pressure P1 by means of a duct (also not shown). In addition, the portion 3 of the housing 1 includes a coupling 10 pierced with an orifice 10a enabling the chamber 5b to be put into communication with a second source of fluid under pressure (not shown) at a pressure P2 by means of a duct (not shown). Although the couplings 9 and 10 are shown as being formed integrally with the portions 2 and 3 respectively of the housing 1, the couplings 9 and 10 can be constituted by separate parts fixed to the portions 2 and 3 of the housing by any appropriate means, e.g. by screw engagement.

When the pressures P1 and P2 respectively existing in the chambers 5a and 5b are different, the membrane 7 deforms. The magnitude of said deformation and its direction give an indication of the value and the sign of the pressure difference P1–P2. As with known pressure sensors, the pressure sensor thus includes means that are sensitive to the deformation of the membrane 7 and that produce an electrical signal that is representative of the pressure difference P1–P2.

In the above-described embodiment of the pressure sensor of the invention, the membrane 7 is made in such a manner as to constitute a plate of two variable capacitance capacitors C1 and C2. To do this, the membrane 7 is associated with two plates 11 and 12 installed stationary in the housing 1 of the sensor on either side of the movable central plate formed by the membrane 7. In the event of a pressure difference P1–P2, the membrane 7 deforms so that its annular portion 7a, having an undulated profile, is displaced in a direction that is perpendicular to its plane, and the sensor means are arranged in such a manner as to measure the value of the displacement of the central annular portion 7a of the membrane 7, and as to give an indication of the upward (P2>P1) or downward (P2<P1) direction of that displacement. Since the pressure sensor of the invention operates on the principle of a differential pair of capacitors, the sensor means perform measurement by measuring the corresponding capacitances C1 and C2 of the first and second variable capacitance capacitors.

In the invention and with reference to FIG. 2, the sensor means comprise a measurement circuit 13 (shown in FIG. 4) for measuring the capacitances C1 and C2 of the first and second variable capacitance capacitors, which circuit is made up of a first circuit 13a and a second circuit 13b.

The circuits 13a and 13b are printed circuits of known type, each including a respective double-sided substrate, the substrate of the circuit 13a being of the same thickness as the substrate of the circuit 13b. The substrates are substantially the same shape and size as the membrane 7 and they are respectively disposed in the non-communicating chambers 5a and 5b of the housing 1 in planes that are substantially parallel to the plane of the membrane 7, and close to said membrane at equal distances therefrom. The outer peripheral regions of the circuits 13a and 13b are respectively connected, by means of gaskets 6, to the corresponding peripheral walls 2b and 3b of the portions 2 and 3 of the housing 1. The inner peripheral regions of the circuits 13a and 13b are respectively connected to the top and bottom peripheral regions of the membrane 7 by the above-mentioned connection means 8. In the embodiment shown in FIG. 2, the connection means 8 are constituted by two identical shims 8a and 8b which are circular in shape and made of metal and which are disposed exactly one on top of the other between the peripheral walls 2b and 3b of the portions 2 and 3 of the housing 1, and between which the plane peripheral portion 7b of the membrane 7 is clamped. The sealing between the membrane 7 and the shims 8a and 8b, and the sealing between the shims 8a and 8b and the circuits 13a and 13b, can be obtained easily by appropriate adhesive. As a result of this arrangement, the peripheral regions of the circuits 13a and 13b are grounded with reference to the portions 2 and 3 of the housing 1, and since the peripheral region of the membrane 7 is in contact with the shims 8a and 8b, it too is grounded. If this arrangement of the membrane 7 is compared with the arrangement of the membrane described in the prior art, it can be seen that the expansion or even the contraction of the plane peripheral portion 7b of the membrane 7 under the effect of a variation in temperature is mitigated as a result of it no longer being fixed directly to the portions 2 and 3 of the housing 1 of the sensor. As a result in particular of the presence of the gaskets 6 and of the adhesive between the membrane 7 and the shims 8a and 8b, and between the shims 8a and 8b and the circuits 13a and 13b, any variation due to temperature can easily be absorbed. In addition, the coefficients of expansion of the membrane 7, of the shims 8a and 8b, and of the circuits 13a and 13b are selected in appropriate manner so as to limit further the risks of thermal expansion or contraction.

Figure 3:
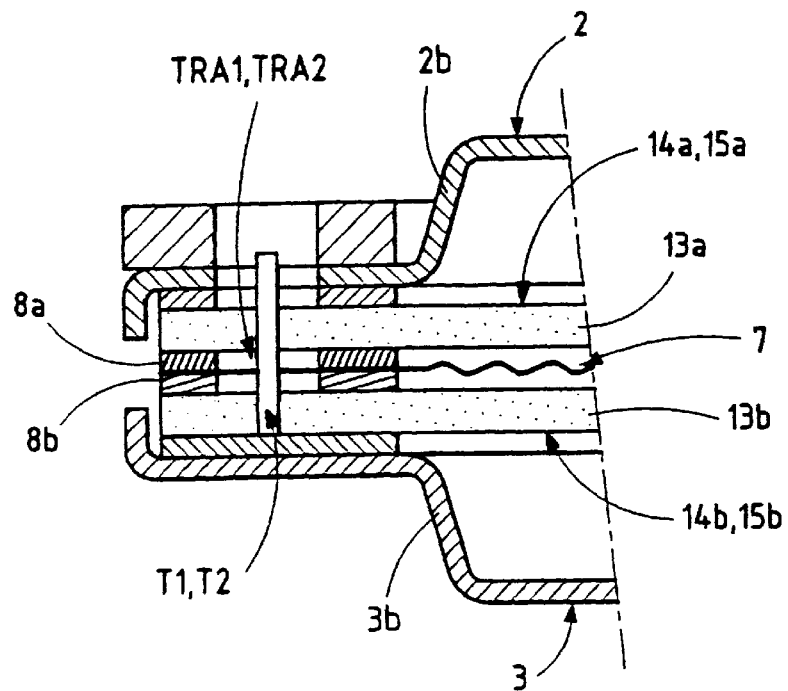
FIG. 3 is a section view of a portion of the periphery of the sensor on line II—II of FIG. 1 showing the connection means which connect the membrane to the first and second circuits.

As can be seen in FIG. 3, the shims 8a and 8b are advantageously used to ensure electrical interconnection of the circuits 13a and 13b. With reference to FIGS. 1 and 3, said shims respectively include first and second bushings which, as a result of the two shims 8a and 8b being superposed exactly, coincide in such a manner as to form two continuous bushings TRA1 and TRA2, each of which has a respective first or second conductor passing therethrough, e.g. a metal rod T1 and a metal rod T2, which pass through the substrates of the first and second circuits 13a and 13b. The corresponding first free ends of the rods T1 and T2 are respectively in contact with the first and second tracks 14a and 15a of the circuit 13a, and the corresponding second free ends of the rods T1 and T2 are respectively in contact with the first and second tracks 14b and 15b of the circuit 13b. As explained below, the tracks 14a, 15a, 14b, and 15b are situated in regions of the circuits 13a and 13b that are special, and in particular in regions that are insensitive to stray capacitance.

With reference to FIG. 2, the faces of the first and second circuits 13a and 13b facing the membrane 7, include respective central annular regions on which the respective fixed plates 11 and 12 of the first and second variable capacitance capacitors C1 and C2 are printed. The variable capacitance capacitors are circular in shape, are of radius that is approximately equal to slightly less than one-third of the radius of the membrane 7 and the circuits 13a and 13b, and are disposed in such a manner that their respective axes coincide with the respective axes of the orifices 9a and 10a. Apart from the two plates, none of the components is designed to be installed on these faces.

Such a disposition of the plates 11 and 12 is much simpler than that described in the prior art since it enables not only the bushings in the plates to be eliminated, but also enables the costly insulating material which surrounds them to be eliminated. In addition, the facts that the plates 11 and 12 are printed directly onto the circuits 13a and 13b and that the distance between the circuits 13a and 13b is determined by the thickness of the shims 8a and 8b means that any risk of the distance separating the plates 11 and 12 from the membrane 7 varying under the effect of temperature variation can be eliminated. Finally, said disposition makes it possible to eliminate the stray capacitance which used to be created between the plate bushings and the sensor housing parts, and the stray capacitance which used to be created between the plates and the sensor housing parts, with said stray capacitance no longer being able to exist given that the plates 11 and 12 are in regions remote from the peripheral region of the sensor, which has been chosen as ground.

In order to prevent the plates 11 and 12 being reached by various dust particles and water droplets which come from the gases whose pressures are to be measured, the portions of the chamber 5a, which are formed on either side of the circuit 13a, and the portions of the chamber 5b, which are formed on either side of the circuit 13b, are arranged so as to communicate respectively with each other via a plurality of through-holes O1 (only one is shown) which are formed in the circuit 13a, and by a plurality of through-holes O2 (only one is shown) which are formed in the circuit 13b. The diameter of the holes O1 and O2 is determined so as to be small in order to prevent the dust particles or water droplets from passing therethrough, and said holes are positioned so as not to be in alignment with the fluid-feed orifices 9a and 9b which are respectively associated therewith. The circuits 13a and 13b and their corresponding holes O1 and O2 certainly do not claim to replace completely the insulating membranes used in the prior art and which have been mentioned above. However, their presence mitigates the varying defects of the membrane which distort measurements, said solution also proving to be much less costly.

Still with reference to FIG. 2, each of the faces of the circuits 13a and 13b, which face away from the membrane 7, includes a region that is sensitive to the displacement of the membrane towards one or other of the fixed plates 11 and 12. In obvious manner, the regions are respectively situated above the region defined by the plate 11 and below the region defined by the plate 12. As explained in greater detail below, the components R1 and D1 that are sensitive to the variation in the variable capacitance C1 of the first capacitor, and the components R2 and D2 that are sensitive to the variation in the capacitance C2 of the second capacitor are respectively mounted on the regions that are sensitive to the displacement of the membrane 7, said components being the same for each of said regions of the circuits 13a and 13b. Another region, specifically one that is insensitive to stray capacitance, is formed on one of the faces of the circuits 13a and 13b facing away from the membrane 7, e.g. on the face of the first circuit 13a. As can be seen in greater detail below, said region is designed for mounting the components (not shown) which form the remainder of the measurement circuit 13.

Figure 4:
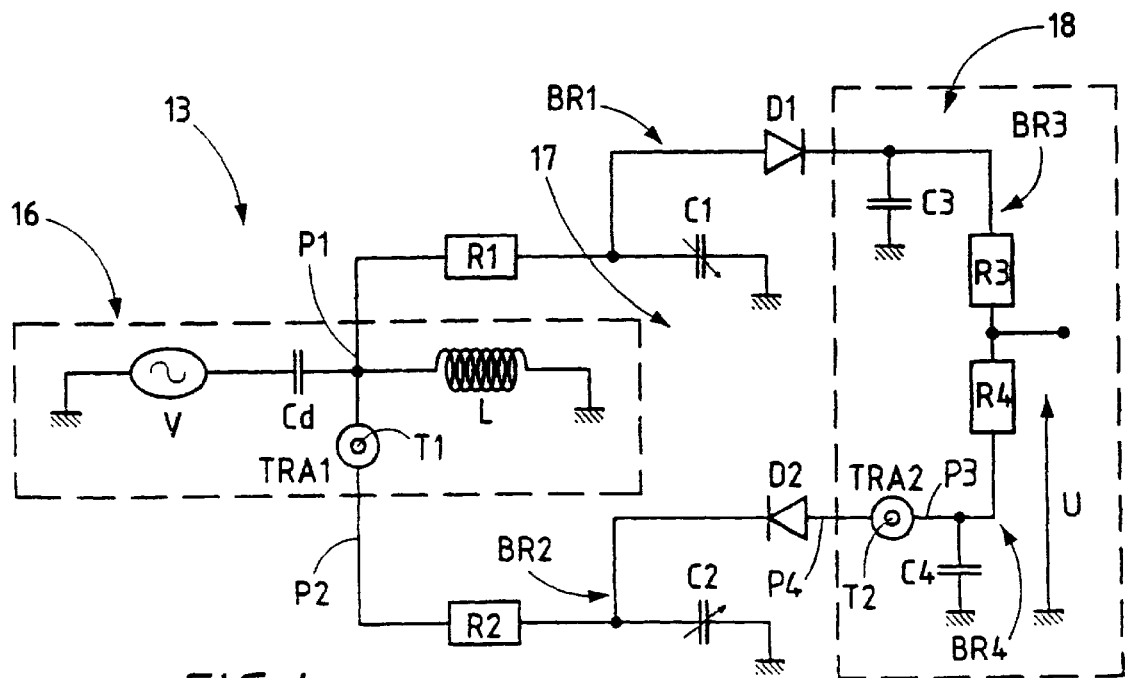
FIG. 4 shows the simplified electronic diagram of the measurement circuit connected to the sensor.
Figure 5:
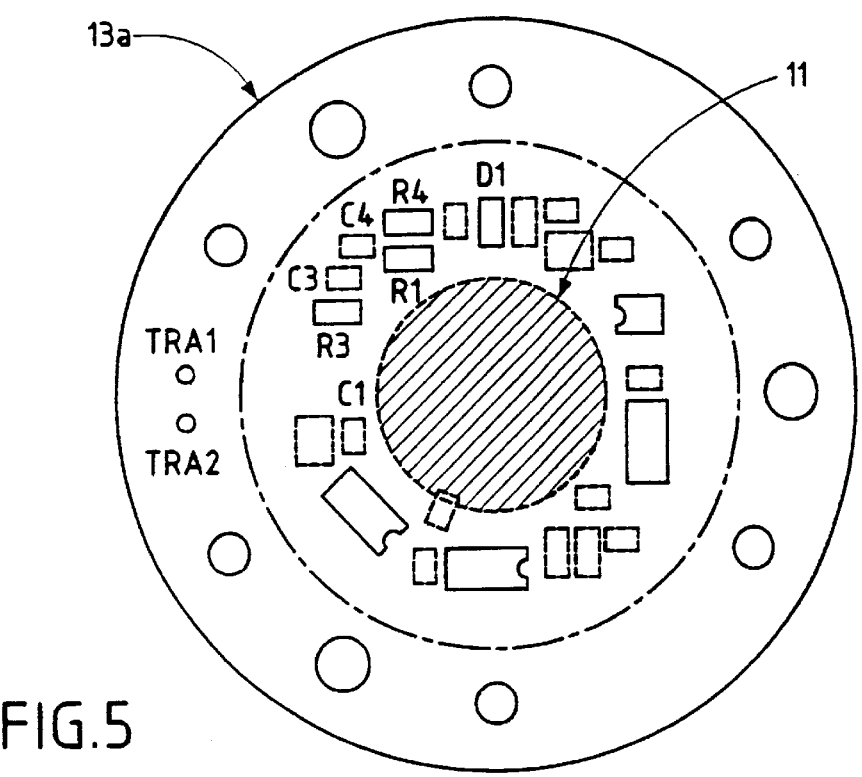
FIG. 5 is a diagram showing where the components are mounted on the face of the first circuit, which faces away from the membrane.
Figure 6:
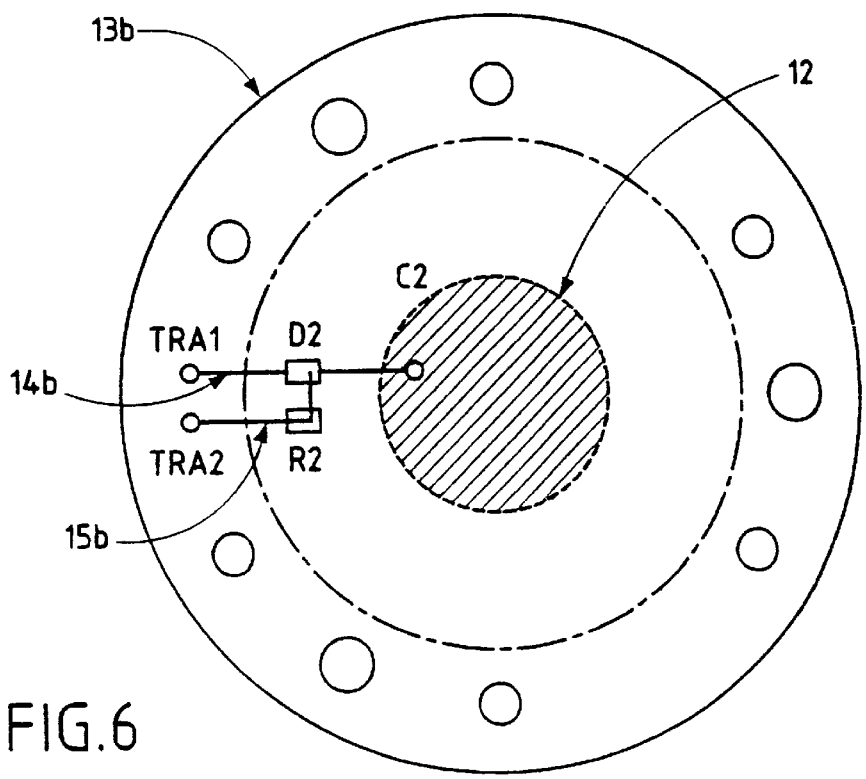
FIG. 6 is a diagram showing where the components are mounted on the face of the second circuit, which faces away from the membrane.

Reference is now made to FIGS. 4, 5, and 6 in order to describe in detail, from an electronic point of view, the content of the regions that are sensitive to the displacement of the membrane 7 which are respectively associated with the circuits 13a and 13b, and the content of the region of the circuit 13a that is insensitive to the stray capacitance.

FIG. 4 is a simplified electronic diagram of the measurement circuit 13. It can be seen that the circuit includes a first portion 16 shown in a dashed-line box which constitutes the power-supply portion of the circuit 13 and which preferably delivers a sinusoidal voltage, a second portion 17 which constitutes the truly active portion of the circuit 13, that is sensitive to the displacement of the membrane 7, and finally a third portion 18 which, like the portion 16, is shown in a dashed-line box, and constitutes the outlet portion of the circuit 13. More particularly, the portion 17 comprises two symmetrical branches BR1 and BR2 having corresponding first ends that are connected to the power-supply portion 16 of the circuit 13, the amplitude of the signal received in each branch BR1 and BR2 depending on the capacitances C1 and C2 to be measured, and having corresponding second ends that are connected to the outlet portion 18 of the circuit 13.

The symmetrical branches BR1 and BR2 of the portion 17 are preferably constituted firstly by fixed resistors R1 and R2 of the same resistance, that are respectively connected in series with variable capacitors C1 and C2 which are both connected to ground, and secondly by diodes D1 and D2 having the same characteristics and having a corresponding anode and a corresponding cathode that are respectively connected between the resistor R1 and the capacitor C1, and between the resistor R2 and the capacitor C2, in such a manner as to detect respectively the positive peaks of the sinusoidal signal generated between R1 and C1 and the negative peaks of the sinusoidal signal generated between R2 and C2.

The power-supply portion 16 of the circuit 13 preferably comprises an AC source V which delivers a sinusoidal voltage to that terminal of the fixed resistors R1 and R2 of each of the branches BR1 and BR2 that is connected to said power supply. As a result of the symmetry of the portion 17 that is sensitive to the displacement of the membrane 7, the voltages respectively obtained in the branches BR1 and BR2 have equal values, the voltage in the branch BR2 being opposite to the voltage in the branch BR1. The sinusoidal voltage delivered by the source V is advantageously free from any undesirable DC component and is, in addition, accurately centered relative to zero. This is achieved in known manner by connecting a decoupling capacitor Cd in series with the source V in order to eliminate any DC component that might be contained in the sinusoidal voltage, and a choke L connected to ground and serving to center the sinusoidal voltage provided by the source V, relative to zero.

In known manner, the outlet portion 18 of the circuit 13 comprises a bridge connection made up of two symmetrical branches BR3 and BR4 that are respectively connected to the cathode of the diode D1 and to the anode of the diode D2 of the active portion 17. The symmetrical branches BR3 and BR4 are preferably constituted by fixed resistors R3 and R4 of the same resistance, that are respectively connected in series with fixed capacitors C3 and C4 which are of the same capacitance and which are both connected to ground. The capacitors C3 and C4 serve to eliminate the AC component of the peaks respectively obtained at the cathode of the diode D1 and at the anode of the diode D2 so that DC can flow in the outlet portion 18 of the measurement circuit 13. The presence of the resistors R3 and R4 in which the DC flows enables a DC voltage U to be measured, for example, in the branch BR4, which is a function of the difference between the capacitances C1–C2, itself descriptive of the difference between the pressures P1–P2 which exist on either side of the membrane 7.

In the diagram shown, for example, R1 and R2 are 5.11 k$\Omega$, R3 and R4 are 10 k$\Omega$, and C3 and C4 are 1 nF. When the difference P1–P2 is zero, the current flowing in R3 and R4 is 0.2 mA and the voltage U is 0 V.

It can be seen from the FIG. 4 diagram of the circuit 13 that the power-supply portion 16 is not sensitive to stray capacitance. Stray capacitance does not influence the difference between the capacitances C1–C2 since they cause the amplitude and the phase of the sinusoidal signals, which are generated in the branches BR1 and BR2 respectively, to vary in the same way. The outlet portion 18 of the circuit 13 is also not sensitive to stray capacitance since it carries DC. Finally, only the branches BR1 and BR2 are sensitive to stray capacitance given that they are excited by the sinusoidal voltage delivered by the source V. Consequently, the invention provides a differential pressure sensor in which the capacitance-measurement circuit 13, compared with conventional capacitance-measurement circuits, is influenced very little by stray capacitance. Since the portions 16 and 18 of the circuit 13 are insensitive to stray capacitance, it is appropriate to select these portions to make the electrical connection between the circuits 13a and 13b via the bushings TRA1 and TRA2. To this end, as can be seen in FIG. 4, the rod T1 contained in the bushing TRA1 has its free ends respectively connected between Cd and L of the circuit 13a via a track P1, and to R2 of the circuit 13b via a track P2, and the rod T2 contained in the bushing TRA2 as its free ends respectively connected to C4 of the circuit 13a via a track P3, and to the anode of D2 of the circuit 13b via a track P4.

As can be seen in FIGS. 5 and 6, all the components of the measurement circuit 13 are preferably surface mounted. More precisely and with reference to FIG. 5, the branch BR1 of the portion 17, that is sensitive to variation in the capacitance C1 of the first variable capacitor, is mounted on the face of the circuit 13a, remote from the membrane 7, in an intermediate annular region of said face. Said intermediate annular region also constitutes the region for mounting the components of the power-supply portion 16, which, being known to the person skilled in the art, are not described or shown, and the region for mounting the components C3, C4, R3, and R4 of the outlet portion 18 of the circuit 13. More precisely and now with reference to FIG. 6, the branch BR2, that is sensitive to variation in the capacitance C2 of the second variable capacitor, is mounted on the face of the circuit 13b, remote from the membrane 7, also in an intermediate annular region of said face. It turns out that this kind of architecture for the circuits 13a and 13b is quite appropriate for solving the problem of the harmful appearance of stray capacitance, since the circuits 13a and 13b are incorporated in the housing 1 of the sensor without requiring connection wires, since the connections between the various components are no longer constituted by wires that might move but by printed tracks, and finally, since the plates 11 and 12 are somewhat isolated from the electrical portions of the circuit 13 that are sensitive to the displacement of the membrane 7, respectively by the substrates of the circuits 13a and 13b. Thus, as a result, differential pressure measurements are much more accurate.

In order to reduce even further the effects of temperature, the components of the pressure sensor are made of appropriate material. By way of illustration, each of the circuits 13a and 13b includes a substrate made of a glass-fiber filled epoxy, the metal shims 8a and 8b are made of steel, and the membrane 7 is made of steel.

Figure 7:
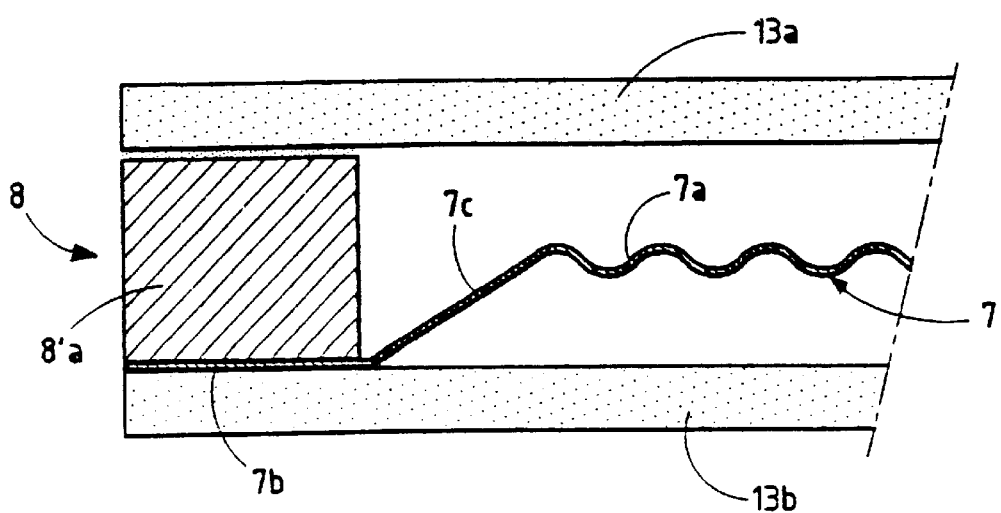
FIG. 7 is a simplified section view of a variant of the connection means which connect the membrane to the first and second circuits.

Naturally, the embodiment of the differential pressure sensor which is described above is given by way of purely indicative and non-limiting example, and many modifications can easily be made thereto by the person skilled in the art, without going beyond the ambit of the invention. Thus, in particular, the connection means 8 can, as shown in FIG. 7, comprise one shim 8'a instead of two shims 8a and 8b. In this case, the peripheral portion 7b of the membrane 7 is clamped between the bottom face of the shim 8'a and the outer peripheral region of the circuit 13b and is, in addition, connected to the portion 7a of the membrane 7 by a sloping portion 7c. Assembly of the connection means 8 is thus simplified and the membrane 7 is stronger since it is mechanically reinforced by the sloping portion 7c, while remaining just as sensitive. Finally, as a result of the presence of the single shim 8'a, the portion 7a of the membrane 7, which is the portion that is truly sensitive to pressure, is less disturbed than with the use of connection means having two shims, since said shims can be assembled together more or less well or poorly (e.g., slightly warped shim, etc.).

What is claimed is:

1. A differential pressure sensor comprising a housing formed of two portions that are assembled together hermetically and that define a closed internal cavity between them, a deformable membrane dividing said internal cavity into two non-communicating chambers which are in communication with sources of fluid under pressure by means of two orifices respectively formed in said portions of the housing, said membrane being made in such a manner as to constitute a plate of first and second variable capacitance capacitors by being associated with two other plates installed in stationary manner in the housing of the sensor on either side of the movable central plate formed by the membrane, and sensor means that are sensitive to deformation of the membrane as a result of a difference between pressures existing in the two chambers in order to produce an electrical signal representative of said pressure difference, wherein the sensor means comprise a measurement circuit for measuring the corresponding capacitances of the first and second variable capacitance capacitors, which circuit is made up of first and second double-sided interconnected circuits, of size similar to that of the membrane, which are respectively disposed in the two non-communicating chambers close to the membrane and substantially parallel to said membrane in such a manner as to divide each of the chambers into two communicating portions, which interconnected circuits are fixed to the membrane in its peripheral region by connection means, faces of the circuits which face the deformable membrane each comprising a region on which the fixed plate of the corresponding first or second variable capacitance capacitor is installed, and faces of the circuits which face away from the membrane each comprising a respective region on which the components that are sensitive to the displacement of the membrane towards one or other of the fixed plates are respectively mounted, and a respective region that is insensitive to stray capacitance, which regions are respectively constituted by peripheral regions of the circuits, another region that is insensitive to stray capacitance being provided on one of said faces facing away from the membrane for mounting the components which form the remainder of the measurement circuit.

2. The sensor according to claim 1, wherein the peripheral regions of the first and second circuits form the ground of the measurement circuit.

3. The sensor according to claim 1, wherein the region that is insensitive to stray capacitance and that is provided on one of the faces of the circuits that faces away from the membrane is made up of a power-supply portion and an outlet portion of the measurement circuit.

4. The sensor according to claim 1, wherein the corresponding regions of the faces of the first and second circuits which are sensitive to the displacement of the membrane, respectively comprise two symmetrical branches having corresponding first ends that are connected to a power-supply portion of the measurement circuit, an amplitude of the signal received in each branch depending on a capacitance to be measured.

5. The sensor according to claim 4, wherein the symmetrical branches that are sensitive to the displacement of the membrane are each constituted firstly by a fixed resistor connected in series with a variable capacitor which is grounded, and secondly by a diode having an anode or a cathode connected between the fixed resistor and the variable capacitor that are associated therewith.

6. The sensor according to claim 5, wherein the region that is insensitive to stray capacitance and that is provided on one of the faces of the circuits that faces away from the membrane is made up of the power-supply portion and an outlet portion of the measurement circuit, and wherein the power-supply portion of the measurement circuit comprises an AC source which delivers a voltage to terminals of the fixed resistors of each branch that are connected to said power supply, the AC voltage delivered being free from any DC component and being centered relative to zero.

7. The sensor according to claim 5, wherein the region that is insensitive to stray capacitance and that is provided on one of the faces of the circuits that faces away from the membrane is made up of the power-supply portion and an outlet portion of the measurement circuit, and wherein the outlet portion of the measurement circuit comprises a bridge connection having two branches that are respectively connected to the anode or to the cathode of the diodes of each branch, each of the branches of the bridge being constituted by the association of a fixed capacitor and of a fixed resistor in such a manner that a DC voltage is measured at terminals of one or other of the branches of the bridge, said voltage expressing the difference in the pressures which exist on either side of the membrane.

8. The sensor according to claim 1, wherein the connection means between the membrane and each of the first and second circuits ensure electrical connection between the first and second circuits, and grounding of the membrane.

9. The sensor according to claim 8, wherein the connection means comprise at least one metal shim which is interposed between the corresponding peripheral regions of the first and second circuits, said shim having one face that is in direct contact with the peripheral region of the membrane so that said membrane is grounded, and includes a plurality of bushings each of which has a respective conductor passing therethrough, which bushings pass through substrates of the first and second circuits at their respective peripheral regions, free ends of the conductors respectively being in contact with tracks of the first circuit and tracks of the second circuit, said tracks being situated in regions of the faces of the circuits that are insensitive to stray capacitance.

10. The sensor according to claim 1, wherein the two communicating portions of each of the non-communicating chambers of the sensor communicate with each other via at least one through-hole which is formed in the circuit associated with each chamber and which is positioned so as not to be in alignment with the associated orifice for supplying fluid under pressure.

* * * * *